(12) United States Patent
Goto

(10) Patent No.: US 8,782,257 B2
(45) Date of Patent: Jul. 15, 2014

(54) COMMUNICATION APPARATUS, AND COMMUNICATION METHOD THEREFOR

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 12/935,873

(22) PCT Filed: Mar. 27, 2009

(86) PCT No.: PCT/JP2009/001413
§ 371 (c)(1),
(2), (4) Date: Sep. 30, 2010

(87) PCT Pub. No.: WO2009/122697
PCT Pub. Date: Oct. 8, 2009

(65) Prior Publication Data
US 2011/0029680 A1 Feb. 3, 2011

(30) Foreign Application Priority Data
Apr. 4, 2008 (JP) ................................. 2008-098269

(51) Int. Cl.
*G06F 15/16* (2006.01)
(52) U.S. Cl.
USPC .......................................... 709/228; 726/23
(58) Field of Classification Search
None
See application file for complete search history.

(56) References Cited

U.S. PATENT DOCUMENTS

| 2006/0193274 | A1* | 8/2006 | Yamagata | 370/310 |
| 2008/0037444 | A1* | 2/2008 | Chhabra | 370/254 |
| 2008/0089300 | A1 | 4/2008 | Yee | |

FOREIGN PATENT DOCUMENTS

| JP | 2008-283422 A | 11/2008 |
| JP | 2010-504055 A | 2/2010 |
| WO | 2008/036660 A2 | 3/2008 |
| WO | WO2008/143040 A1 | 11/2008 |

OTHER PUBLICATIONS

Mishra, Amitabh, Ketan Nadkarni, and Animesh Patcha. "Intrusion detection in wireless ad hoc networks." Wireless Communications, IEEE 11, No. 1 (2004): 48-60.*
Japanese Office Action for Application No. 2008-098269 dated Apr. 24, 2012.
"Wi-Fi Certified(TM) for Wi-Fi Protected Setup: Easing the User Experience for Home and Small Office Wi-Fi® Networks", 2007, 2008, 2009 Wi-Fi Alliance, pp. 2-14.

* cited by examiner

*Primary Examiner* — Jeffrey Pwu
*Assistant Examiner* — Carlos Amorin
(74) *Attorney, Agent, or Firm* — Carter, DeLuca, Farrell & Schmidt, LLP

(57) ABSTRACT

In a communication-parameter providing apparatus, a search is conducted at the start of a communication-parameter automatic setting process. Upon detection of a communication apparatus, the rate at which the communication-parameter providing apparatus sends a beacon per unit time is increased, whereby a communication-parameter receiving apparatus can easily detect the communication-parameter providing apparatus.

11 Claims, 10 Drawing Sheets

COMMUNICATION APPARATUS, AND COMMUNICATION METHOD THEREFOR

TECHNICAL FIELD

The present invention relates to communication apparatuses and communication methods therefor.

BACKGROUND ART

In wireless communication represented by wireless local area networks (LANs) conforming to the Institute of Electrical and Electronics Engineers (IEEE) 802.11 standard series, there are many setting items that must be set prior to use.

For example, as setting items, there are communication parameters needed to perform wireless communication, such as the Service Set Identifier (SSID) which is a network identifier, an encryption method, an encryption key, an authentication method, and an authentication key. It is very complicated for the user to manually enter and set these communication parameters.

Therefore, various manufacturers have devised automatic setting methods for easily setting communication parameters in wireless devices. In these automatic setting methods, one device provides communication parameters to another device connected thereto using a procedure and messages determined in advance between these connected devices, and accordingly the communication parameters are automatically set.

Non Patent Citation 1 discloses an example of automatically setting communication parameters.

In the communication-parameter automatic setting method of Non Patent Citation 1, the role of a providing apparatus that provides communication parameters to another wireless device and the role of a receiving apparatus that receives the communication parameters provided by the providing apparatus and sets the communication parameters in the receiving apparatus are necessary.

Therefore, when a wireless device is to receive provided communication parameters by performing automatic setting, the wireless device must find a providing apparatus that provides communication parameters.

However, because there is a problem that a providing apparatus does not necessarily respond to a signal for searching for a providing apparatus, it is not easy to find a communication-parameter providing apparatus.

For example, in an Independent Basic Service Set (IBSS) ad-hoc network conforming to the IEEE 802.11 standard, a station that sends a response to a probe request that is a search request signal is a station that sent the last beacon. Therefore, even when a wireless device sends a probe request for searching for a providing apparatus, a device that is not a providing apparatus may respond to this probe request. Accordingly, it is difficult to determine a communication-parameter providing apparatus. As a result, there is a problem that a communication-parameter setting process cannot be performed.

[Non Patent Citation 1]

Wi-Fi CERTIFIED™ for Wi-Fi Protected Setup: Easing the User Experience for Home and Small Office Wi-Fi(R) Networks, http://www.wi-fi.org/wp/wifi-protected-setup

DISCLOSURE OF INVENTION

The present invention provides techniques for enabling a receiving apparatus that receives provided communication parameters to easily and quickly detect a providing apparatus that provides communication parameters.

Further features of the present invention will become apparent from the following description of exemplary embodiments with reference to the attached drawings.

The present invention provides a communication apparatus including: a providing unit configured to provide a communication parameter to a communication-parameter receiving apparatus that receives a provided communication parameter for performing communication; a search unit configured to perform a search process for detecting another communication apparatus; and a change unit configured to change a parameter that controls sending of a broadcast signal, on the basis of a search result obtained by the search unit, in order to increase the number of broadcast signals sent by the communication apparatus per unit time.

DESCRIPTION OF EMBODIMENTS

First Embodiment

A communication apparatus according to an embodiment of the present invention will now herein be described in detail with reference to the drawings. Although the following description concerns an example in which a wireless LAN system conforming to the IEEE 802.11 series is employed, the communication configuration is not necessarily limited to a wireless LAN conforming to IEEE 802.11.

An exemplary hardware configuration according to the embodiment will be described.

Figure 1:
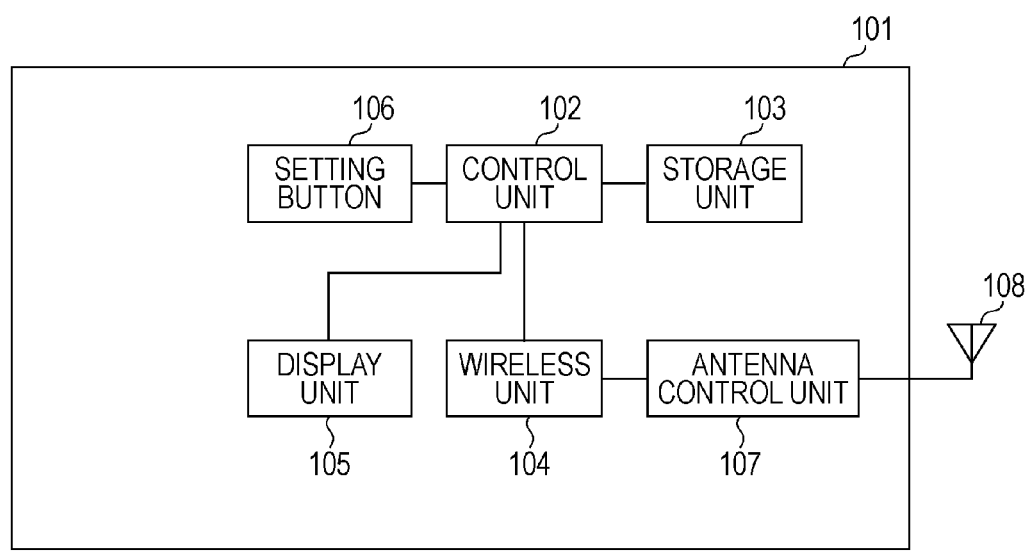
FIG. 1 is a block diagram of an apparatus.

FIG. 1 is a block diagram showing an exemplary structure of each apparatus, which will be described later, according to the embodiment of the present invention. FIG. 1 shows the entirety of an apparatus 101. A control unit 102 controls the entire apparatus 101 by executing a control program stored in a storage unit 103. The control unit 102 additionally controls setting of communication parameters with another apparatus. The storage unit 103 stores the control program executed by the control unit 102 and various items of information, such as communication parameters. Various operations described later are performed by executing, with the control unit 102, the control program stored in the storage unit 103.

A wireless unit 104 performs wireless communication. A display unit 105 performs various displays. The display unit 105 has a function of outputting information in a visually recognizable manner, as in a liquid crystal display (LCD) or a light-emitting diode (LED), or a function of outputting sounds, as in a loudspeaker.

A setting button 106 is used for triggering or starting a communication-parameter setting process. A communication-parameter automatic setting process starts when the setting button 106 is operated. By detecting an operation entered by a user using the setting button 106, the control unit 102 starts processes shown in FIGS. 4 to 10, which will be described later.

An antenna control unit 107 controls an antenna 108.

Figure 2:
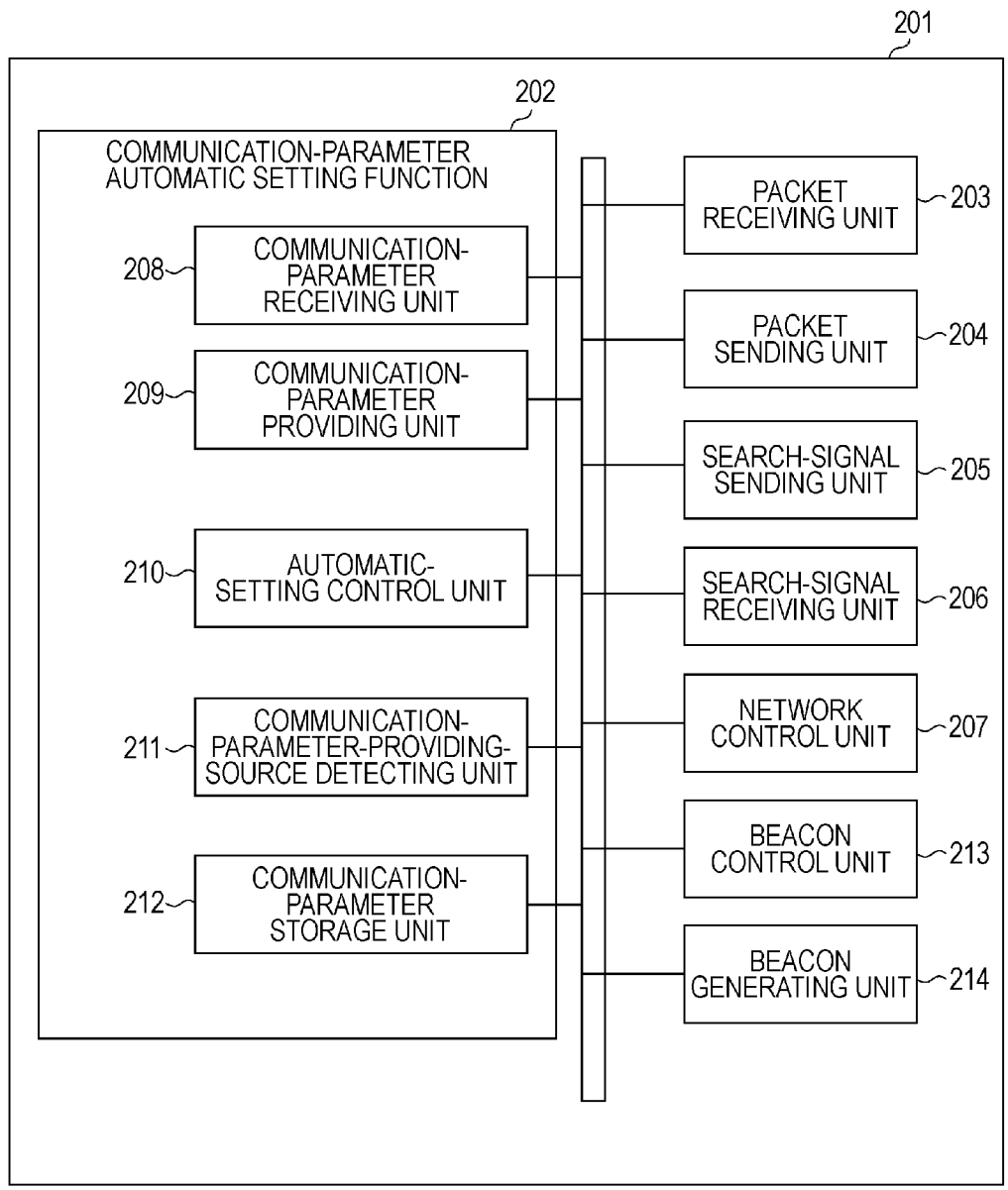
FIG. 2 is a software functional block diagram of the interior of the apparatus according to an embodiment of the present invention.

FIG. 2 is a block diagram showing an exemplary configuration of software function blocks performed by an apparatus that provides a communication-parameter setting operation function, which will be described later.

FIG. 2 shows the entirety of an apparatus 201. The apparatus 201 includes a communication-parameter automatic setting function block 202. In this embodiment, automatic setting of communication parameters needed to perform wireless communication, such as the SSID which is a network identifier, an encryption method, an encryption key, an authentication method, and an authentication key, is performed.

A packet receiving unit 203 receives packets related to various communications. Receiving of a beacon (broadcast signal) is performed by the packet receiving unit 203. A packet sending unit 204 sends packets related to various communications. Sending of a beacon is performed by the packet sending unit 204. Various items of information (self-information) of the sending source device are added to a beacon.

A search-signal sending unit 205 controls sending of a device search signal, such as a probe request. A probe request may be a network search signal for searching a desired network. Sending of a probe request is performed by the search-signal sending unit 205. Also, sending of a probe response, which is a response signal to the received probe request, is performed by the search-signal sending unit 205.

A search-signal receiving unit 206 controls receiving of a device search signal, such as a probe request, from another apparatus. Receiving of a probe request is performed by the search-signal receiving unit 206. Also, receiving of a probe response is performed by the search-signal receiving unit 206. Various items of information (self-information) of the sending source device are added to a device search signal and a response signal in response thereto.

A network control unit 207 controls a network connection. Participation into a wireless LAN ad-hoc network, for example, is performed by the network control unit 207.

In the communication-parameter automatic setting function block 202, a communication-parameter receiving unit 208 receives communication parameters from a partner device, and a communication-parameter providing unit 209 provides communication parameters to a partner device. An automatic-setting control unit 210 controls various protocols in communication-parameter automatic setting. A communication-parameter automatic setting process, which will be described later, is performed by the communication-parameter receiving unit 208 and the communication-parameter providing unit 209 under control of the automatic-setting control unit 210. In addition, the automatic-setting control unit 210 determines whether a time elapsed since the start of a communication-parameter automatic setting process has exceeded a time limit of the setting process. When it is determined that the elapsed time has exceeded the time limit, the automatic-setting control unit 210 performs control to terminate the setting process.

A communication-parameter-providing-source detecting unit 211 detects a communication-parameter providing apparatus. A communication-parameter providing apparatus is detected by sending and responding to a search signal, which are performed by the search-signal sending unit 205 and the search-signal receiving unit 206. Alternatively, a communication-parameter providing apparatus may be detected by receiving a beacon using the packet receiving unit 203. When a device wishes to receive provided communication parameters, the device requests a detected providing apparatus to provide communication parameters, and receives the provided communication parameters.

A communication-parameter storage unit 212 stores communication parameters provided from a providing apparatus. The communication-parameter storage unit 212 corresponds to the storage unit 103.

A beacon control unit 213 controls a sending timing of a beacon (broadcast signal). A beacon sending algorithm in an IEEE 802.11 wireless LAN ad-hoc network will be described.

In the ad-hoc network, beacons are sent by all apparatuses included in the network in an autonomous distributed manner. A beacon sending interval (beacon period) is to be determined by the apparatus that first configured the ad-hoc network. In general, a beacon is sent from any of the apparatuses at an interval of about 100 ms.

A beacon sending timing is controlled by a parameter called a contention window (or a random number generation range; hereinafter abbreviated as "CW"). Each apparatus in the network obtains a random value (CWrand) from 0 to CW at the time of sending a beacon. A waiting time (back-off time) until sending a beacon is obtained by multiplying CWrand by a predetermined interval (slot time). The waiting time until sending a beacon is decremented by the slot time, and, when the waiting time becomes zero, a beacon is sent. If an apparatus receives a beacon from another apparatus before sending a beacon, the apparatus stops sending a beacon. In this way, contention of beacons sent from apparatuses can be avoided. Each apparatus in the ad-hoc network selects a random number from 0 to CW. Among apparatuses included in the network, an apparatus that has selected the smallest CWrand sends a beacon.

For example, when the same CW, serving as an initial value, is set to all apparatuses, the probability of sending a beacon is the same for all apparatuses. As a result, the number of beacons sent per unit time is substantially the same for all apparatuses. In other words, the frequency of sending a beacon (sending rate) is the same for all apparatuses. In contrast, when one apparatus in the network sets its CW to a value less than the initial value, the probability of sending a beacon becomes higher for this apparatus than for any other apparatus. That is, CW is a parameter for determining the probability of sending a beacon or a parameter for determining the number of beacons sent per unit time. In other words, CW is a parameter for determining a beacon sending rate of each apparatus. That is, CW is a parameter for determining a beacon sending timing or a parameter for determining a waiting time until sending a beacon.

The value of CW is changeable within the range from CWmin (minimum value) to CWmax (maximum value). When CW is set to CWmin, the number of beacons sent per unit time is maximized. When CWinit (>CWmin) is set as an initial value and when no communication-parameter automatic setting process is being performed, a beacon is sent using the initial value. A beacon generating unit 214 generates a beacon, and the generated beacon is sent using the packet sending unit 204 to a network.

Figure 3:
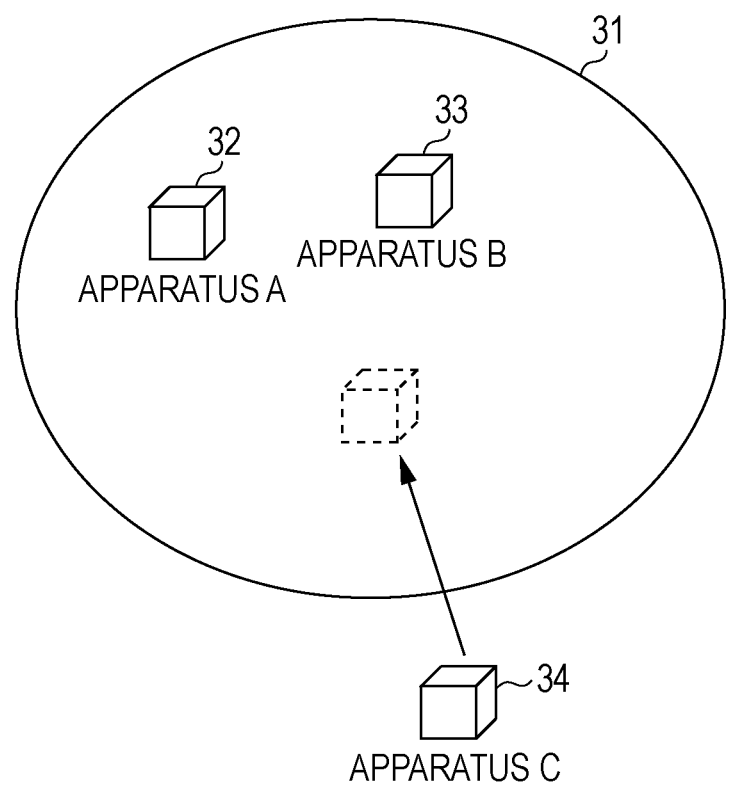
FIG. 3 is a network diagram according to the embodiment of the present invention.

FIG. 3 is a diagram showing a communication apparatus A32 (hereinafter called an apparatus A), a communication apparatus B33 (hereinafter called an apparatus B), and a communication apparatus C34 (hereinafter called an apparatus C). All these apparatuses have the foregoing configurations shown in FIGS. 1 and 2.

The apparatus A operating as a communication-parameter providing apparatus stores configuration information of an ad-hoc network 31. The apparatus B has already performed communication-parameter automatic setting with the apparatus A. Now, the case where the apparatus C wishes to participate in the network 31 including the apparatus A and the apparatus B will be considered. The apparatus C operates as a communication-parameter receiving apparatus and receives communication parameters provided from the apparatus A, which is a providing apparatus.

Figure 7:
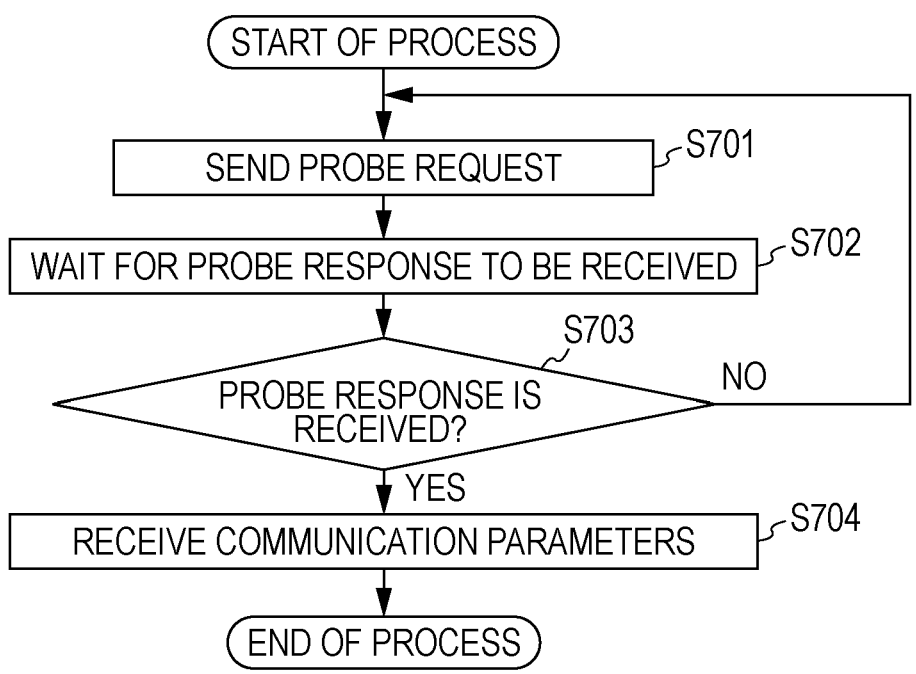
FIG. 7 is a flowchart showing an operation of a communication-parameter receiving apparatus according to the embodiment.

FIG. 7 is a flowchart of the operation of the apparatus C operating as a communication-parameter receiving apparatus. When the setting button 106 in the apparatus C is operated by a user, the process shown in FIG. 7 is started. When the setting button 106 is operated, a timer for determining whether a time limit of a communication-parameter automatic setting process has reached is activated. When this timer expires, the communication-parameter setting process is terminated even during the processing in steps S701 to S704.

After the process has started, the apparatus C sends a probe request (S701) and waits for a probe response, which includes additional information indicating communication-parameter automatic setting, to be sent from a providing apparatus (apparatus A in this example) (S702). A probe response including additional information indicating communication-parameter automatic setting is a probe response sent from a providing apparatus during a communication-parameter automatic setting process. When an automatic setting process is not being performed, a probe response including no additional information indicating communication-parameter automatic setting is sent. In this way, a providing apparatus that has started a communication-parameter setting process can be detected by checking a probe response. Alternatively, a probe request including additional information indicating communication-parameter automatic setting may be sent. In this way, an apparatus that has received the probe request can detect a receiving apparatus that has started a communication-parameter setting process.

When no probe response including additional information is received in a certain time (NO in S703), the flow returns to step S701, and a probe request is sent again.

When a probe response including additional information is received, the apparatus C requests the apparatus A, which is a providing apparatus, to provide communication parameters. The apparatus C receives communication parameters from the apparatus A and stores the communication parameters in the storage unit 103 (S704). By using the stored communication parameters, the apparatus C can participate in the network 31, and can perform data communication with the apparatus A and the apparatus B.

Figure 4:
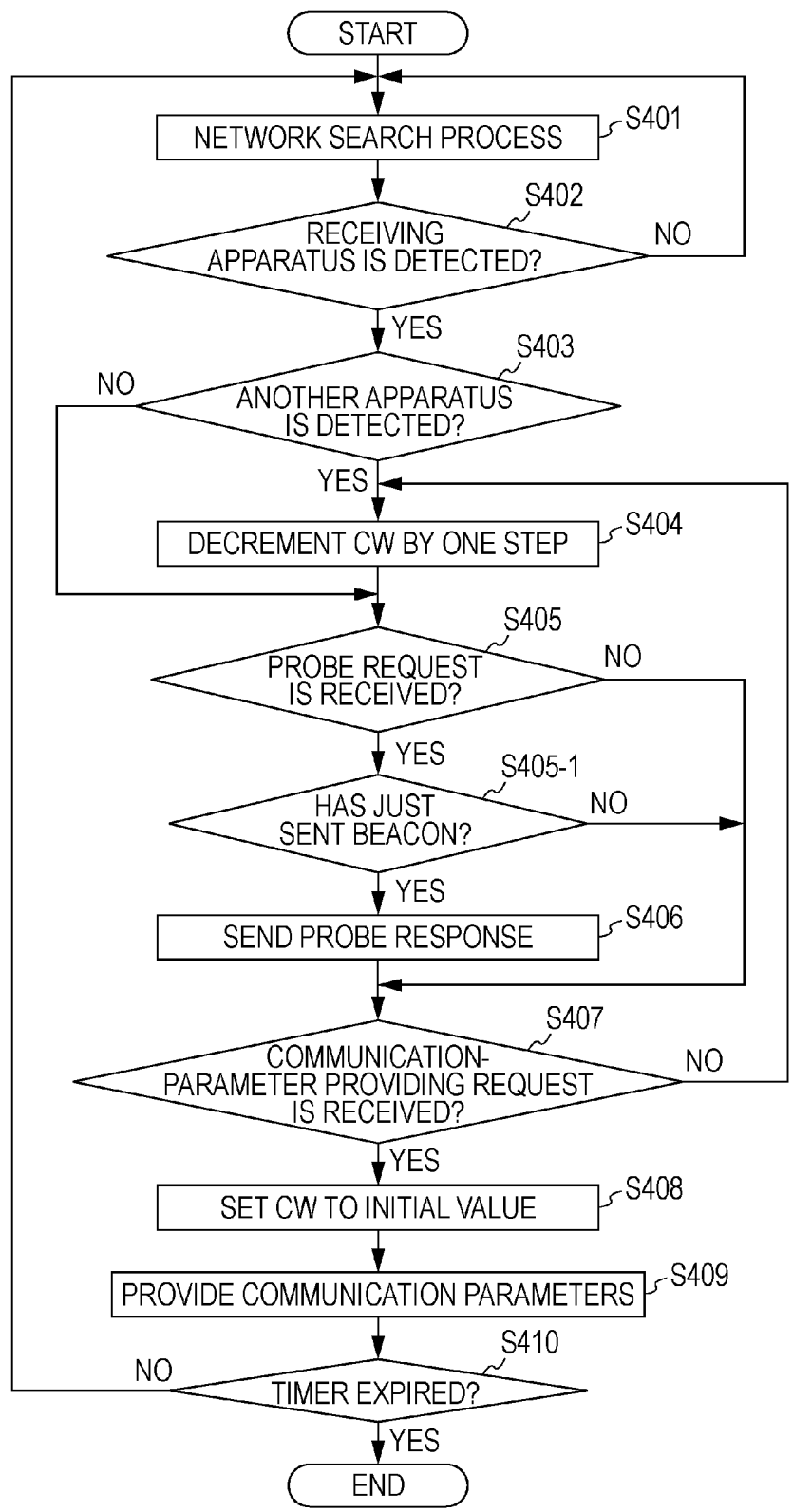
FIG. 4 is a flowchart showing a connecting operation of a communication-parameter providing apparatus according to a first embodiment.

In an IEEE 802.11 wireless LAN ad-hoc network, it is defined that an apparatus that sends a probe response is an apparatus that sent a beacon immediately before receiving a probe request. Therefore, in steps S701 to S703, if a providing apparatus sent no beacon immediately before receiving a probe request sent from the apparatus C, the providing apparatus sends no probe response including additional information indicating communication-parameter automatic setting. Therefore, even when there is a providing apparatus that has started a communication-parameter setting process, the apparatus C may not be able to detect the providing apparatus before the time limit of the automatic setting process expires. In FIG. 4 described later, a process performed by a providing apparatus to solve this problem is illustrated.

In steps S701 to S703, a method of searching for a providing apparatus that has started a communication-parameter setting process, by waiting for reception of a probe response to a probe request ("active scan"), has been described. Since a providing apparatus that is currently performing a communication-parameter setting process sends a beacon including additional information indicating communication-parameter automatic setting, the apparatus C may use a method of waiting for the beacon to be sent for a certain time ("passive scan"). As has been described above, each apparatus in the IEEE 802.11 wireless LAN ad-hoc network randomly sends a beacon. Therefore, even when the passive scan method is used, the apparatus C may not be able to receive a beacon including the above-described additional information from a providing apparatus before the time limit of the communication-parameter automatic setting process expires.

FIG. 4 is a flowchart of the operation of the apparatus A operating as a communication-parameter providing apparatus. When the setting button 106 is operated in the apparatus A, the process shown in FIG. 4 is started. When the setting button 106 is operated, a timer for determining whether a time limit of a communication-parameter automatic setting process has reached is activated. When this timer expires, the communication-parameter setting process is terminated even during the processing in steps S401 to S409.

When a communication-parameter automatic setting process starts, the apparatus A performs a network search process for checking the situations of a nearby network (S401). The apparatus A determines, on the basis of the result of the network search, whether a communication-parameter receiving apparatus is detected (S402).

There are two search methods, the active scan method and the passive scan method. Any of the two methods can be used, or the two methods can be combined to perform a search process.

As has been described above, active scan is a method of sending a probe request and waiting for a probe response from another apparatus. Passive scan is a method of waiting for a beacon from another apparatus.

As has been described above, when a probe request including additional information indicating communication-parameter automatic setting is received, it can be determined that a receiving apparatus exists. That is, waiting for a probe request including additional information indicating communication-parameter automatic setting is included in the network search process in this embodiment.

When no communication-parameter receiving apparatus is detected in step S402, the flow returns to step S401, and the network search process is repeated until a communication-parameter receiving apparatus is detected.

When a communication-parameter receiving apparatus is detected in step S402, whether another apparatus exists in the network 31 is determined on the basis of the result of the network search in step S401 (S403).

When another apparatus is detected in step S403, it means that, besides the apparatus A, there is an apparatus that sends a beacon in the network 31. In this embodiment, since there is the apparatus B in the network 31, the apparatus A and the apparatus B send a beacon one at a time.

As has been described above, in the IEEE 802.11 wireless LAN ad-hoc network, it is defined that an apparatus that sends a probe response is an apparatus that sent a beacon immediately before receiving a probe request.

Therefore, in a providing apparatus search process (steps S701 to S703 shown in FIG. 7) performed by a communication-parameter receiving apparatus (apparatus C in this embodiment), the beacon control unit 213 sets CW of the apparatus A (hereinafter simply referred to as "CW" unless otherwise stated) to a value that is one step less than the initial value so that the apparatus A can be detected in a short period of time (S404). Accordingly, the number of beacons sent by the apparatus A per unit time becomes greater than the number of beacons sent by the apparatus B per unit time.

By setting the beacon sending frequency (sending rate) of the apparatus A higher than that of the apparatus B, when the apparatus C searches for a providing apparatus by performing active scan, the probability of the apparatus C receiving a probe response from the apparatus A becomes higher. Even in the case where the apparatus C searches for a providing apparatus by performing passive scan, the probability of receiving a beacon from the apparatus A becomes higher. As a result, the probability of the apparatus C not detecting the apparatus A, which is a providing apparatus, before the time limit of the communication-parameter setting process expires can be reduced. If the apparatus C can detect the apparatus A in a short period of time, the time until completion of providing communication parameters can be reduced.

If no other apparatus is detected in step S403, it means that the apparatus A is the only apparatus that sends a beacon in the network 31. Therefore, the apparatus C, which is a receiving apparatus, can easily detect the apparatus A, which is a providing apparatus. Thus, CW is not changed, and the flow proceeds to step S405. Even when no other apparatus is detected, a network search process may periodically be performed, and, if another apparatus is detected, the value of CW may be changed.

When the apparatus A receives a probe request in step S405, it is determined whether the apparatus A sent a beacon immediately before receiving the probe request (S405-1).

When the apparatus A sent a beacon immediately before receiving the probe request, the apparatus A sends a probe response including additional information indicating communication-parameter automatic setting (S406). When the apparatus A sent no beacon immediately before receiving the probe request, the flow proceeds to step S407.

The apparatus A waits for a communication-parameter providing request to be received from the apparatus C, which is a receiving apparatus (S407). When a certain time has elapsed without receiving a communication-parameter providing request in step S407, there is a possibility that the apparatus C could not detect the apparatus A, which is a providing apparatus. Therefore, the value of CW is set to a value that is one more step less than the current value (S404). In this manner, the value of CW is reduced step by step until a communication-parameter providing request is received from a receiving apparatus. In this way, the number of beacons sent by the apparatus A per unit time becomes yet higher than the number of beacons sent by the apparatus B per unit time. Therefore, the probability of the apparatus C detecting the apparatus A is further increased.

When a communication-parameter providing request from the apparatus C is received in step S407, it can be determined that the apparatus C has detected the apparatus A. Thereafter, it becomes unnecessary for the apparatus A to send more beacons than that sent by the apparatus B. Thus, the beacon control unit 213 resets CW to the initial value (S408). As a result, the number of beacons sent by the apparatus A per unit time becomes equivalent to the number of beacons sent by the apparatus B. As above, when a communication-parameter providing request is received from a receiving apparatus, the beacon sending frequency (sending rate) is reset to that of other apparatuses, whereby unnecessary power consumption can be suppressed.

Thereafter, communication parameters are provided to the receiving apparatus C, which has requested communication parameters to be provided (S409).

After the communication parameters are provided, the apparatus A determines whether the timer for determining whether the time limit of the communication-parameter automatic setting process has reached has expired (S410).

When the timer has not expired, the flow returns to step S401 and is repeated. In contrast, when the timer has expired in step S410, the communication-parameter automatic setting process is terminated. When communication parameters are provided to one receiving apparatus, the process may be terminated without performing the determination in step S410.

In the above embodiment, the case where there is, besides the apparatus A, only one apparatus B in the network has been described. However, the case where there is a plurality of other apparatuses in the network is also conceivable. When the same CW is set to all the apparatuses, the greater the number of apparatuses in the same network, the less the number of beacons sent by each apparatus per unit time. Therefore, CW may be set to a smaller value as the number of detected other apparatuses increases. In this way, even if there are many apparatuses in the same network, the rate at which a providing apparatus sends a beacon can be increased.

After other apparatuses are detected, a network search process may periodically be performed. If another new apparatus is detected, CW may be set to a yet smaller value. As above, by periodically searching for other apparatuses, even when there are many apparatuses in the same network, the rate at which a providing apparatus sends a beacon can be increased.

In the above embodiment, it has been described that, by the network search process in step S401, whether a receiving apparatus exists, and whether another apparatus exists in the network 31 are determined. However, these determinations may be made by performing individual search processes. For example, a search for a receiving apparatus may be performed by waiting for reception of a probe request including additional information indicating communication-parameter automatic setting, and thereafter, a search for another apparatus in the network 31 may be performed by performing active scan.

As above, according to this embodiment, when an apparatus other than a providing apparatus exists in a network, control is performed to increase the number of beacons sent by the providing apparatus per unit time. Therefore, the probability of a receiving apparatus detecting the providing apparatus in a short period of time can be increased. As a result, the probability of the receiving apparatus not detecting the providing apparatus before the time limit of a communication-parameter setting process expires can be reduced. Since the providing apparatus is detected in a short period of time, the time until completion of providing communication parameters can be reduced. Furthermore, when a communication-parameter providing request is received from the receiving apparatus, the number of beacons sent per unit time is controlled to be equivalent to that of other apparatuses, whereby unnecessary power consumption can be suppressed.

Second Embodiment

In the first embodiment, the case where a communication-parameter providing apparatus confirms the existence of a communication-parameter receiving apparatus and, if another communication apparatus is detected in a network where the providing apparatus exists, changes CW has been described. In a second embodiment, an example where the providing apparatus changes CW upon detection of the existence of a receiving apparatus, or the existence of another communication apparatus in a network where the providing apparatus exists, will be described. Since the operation of the apparatus C serving as a receiving apparatus is the same as that in the first embodiment described with reference to FIG. 7, a repeated description thereof is omitted to avoid redundancy.

Figure 8:
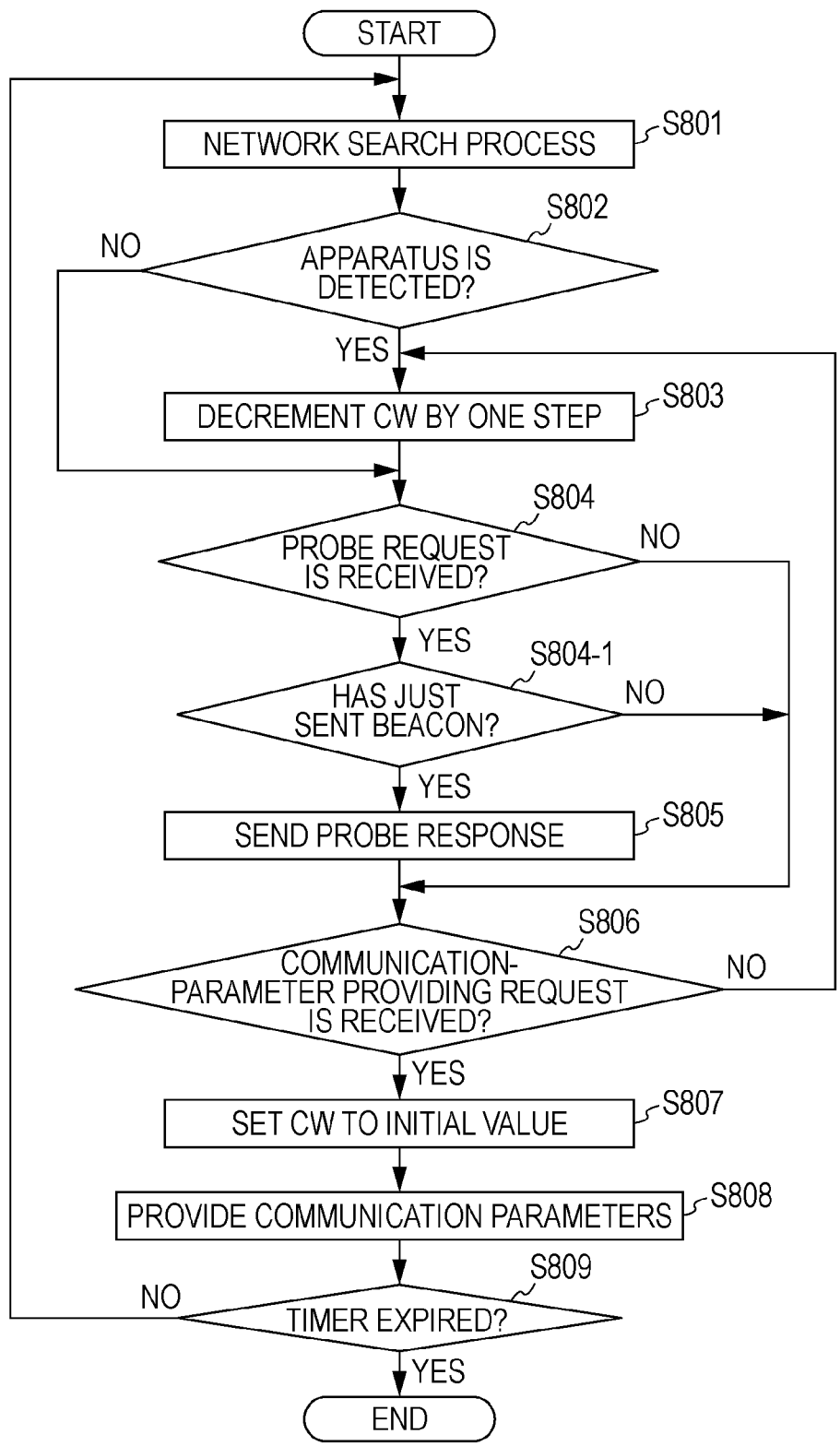
FIG. 8 is a flowchart showing an operation of a communication-parameter providing apparatus according to a second embodiment.

FIG. 8 is a flowchart of the operation of the apparatus A operating as a communication-parameter providing apparatus. When the setting button 106 is operated in the apparatus A, the process shown in FIG. 8 is started. When the setting button 106 is operated, a timer for determining whether a time limit of a communication-parameter automatic setting process has reached is activated. When the timer has expired, the communication-parameter setting process is terminated even during the processing in steps S801 to S808.

When a communication-parameter automatic setting process starts, the apparatus A performs a network search process for checking the situations of a nearby network (S801). It is determined, on the basis of the result of the network search process, whether a communication-parameter receiving apparatus is detected or whether another apparatus exists in the network 31 (S802).

There are two search methods, the active scan method and the passive scan method. Any of the two methods can be used, or the two methods can be combined to perform a search process. As has been described above, when a probe request including additional information indicating communication-parameter automatic setting is received, it can be determined that a receiving apparatus exists. That is, waiting for a probe request including additional information indicating communication-parameter automatic setting is included in the network search process in this embodiment.

When a communication-parameter receiving apparatus, or another apparatus existing in the network 31, is detected, the flow proceeds to step S803, and CW is set to a value that is one step less than the initial value.

That is, when a communication-parameter receiving apparatus is detected, CW is changed regardless of whether another apparatus in the network 31 is detected. In this way, when another apparatus exists in the network 31, the sending frequency (sending rate) of the apparatus A becomes higher than that of this other apparatus. Thus, the probability of the apparatus C, which is a receiving apparatus, detecting the apparatus A in a short period of time becomes higher. When the existence of another apparatus in the network 31 is detected, CW is changed regardless of whether a communication-parameter receiving apparatus is detected. In this way, even when the receiving apparatus starts a communication-parameter automatic setting process after the apparatus A, the probability of the receiving apparatus detecting the apparatus A immediately after the start of the setting process becomes higher.

Since the processing from step S803 onward is the same as the processing from step S404 onward in FIG. 4, a repeated description thereof is omitted to avoid redundancy.

As above, according to this embodiment, CW is changed when another apparatus existing in the same network or a receiving apparatus is detected, whereby the probability of the receiving apparatus detecting a providing apparatus in a short period of time can be increased. As a result, the probability of the receiving apparatus not detecting the providing apparatus before the time limit of a communication-parameter setting process expires can be reduced. Since the providing apparatus is detected in a short period of time, the time until completion of providing communication parameters can be reduced. Furthermore, when a communication-parameter providing request is received from the receiving apparatus, the number of beacons sent per unit time is controlled to be equivalent to that of other apparatuses, whereby unnecessary power consumption can be suppressed.

Third Embodiment

In the first and second embodiments, the case where a communication-parameter providing apparatus increases the beacon sending frequency (sending rate) step by step until reception of a communication-parameter providing request from a receiving apparatus has been described. In a third embodiment, an example where the time required for a receiving apparatus to detect a providing apparatus is further reduced by maximizing the number of beacons sent per unit time at the point at which the providing apparatus detects another apparatus will be described. Since the operation of the apparatus C serving as a receiving apparatus is the same as that in the first embodiment described with reference to FIG. 7, a repeated description thereof is omitted to avoid redundancy.

Figure 5:
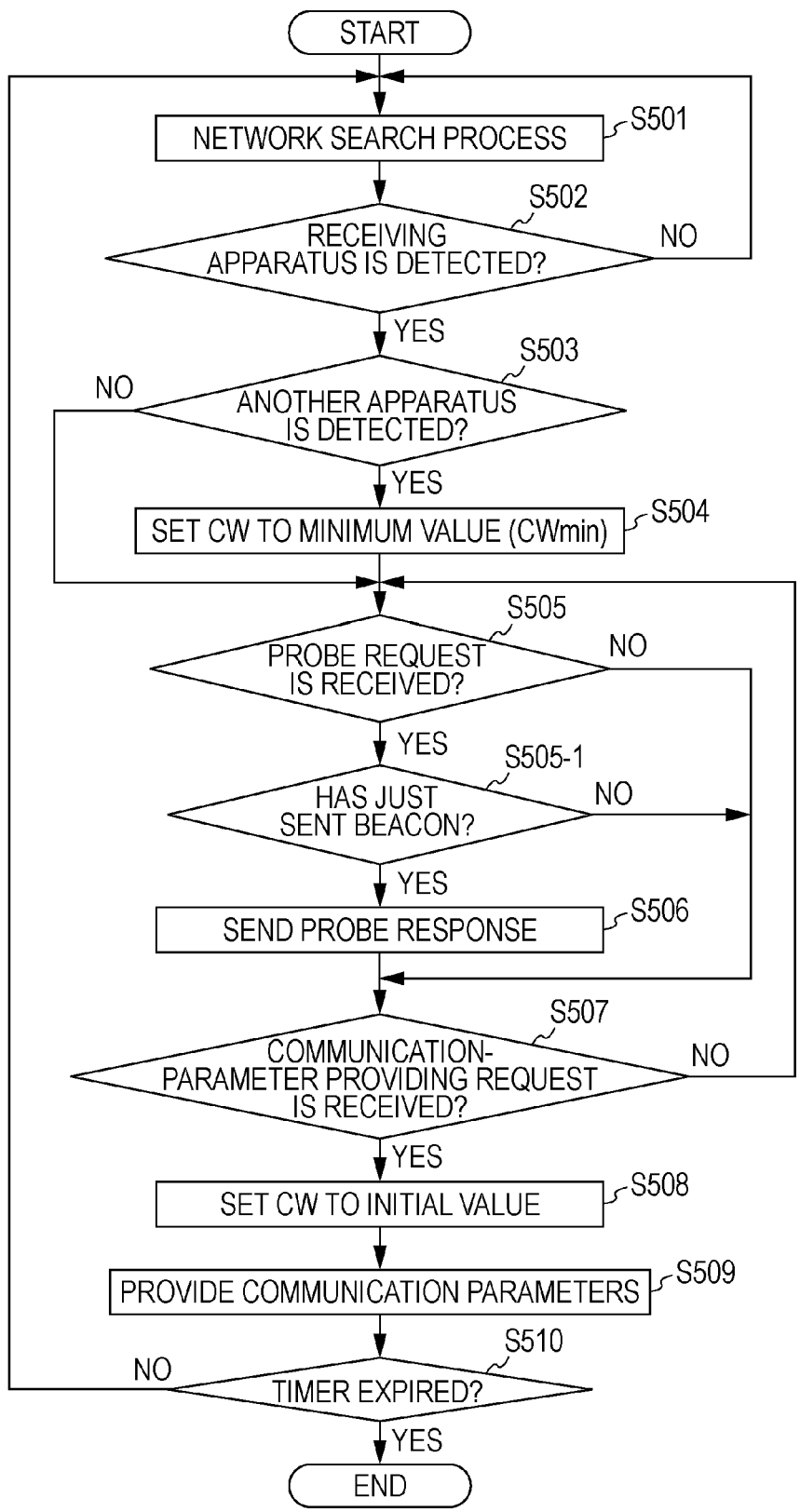
FIG. 5 is a flowchart showing an operation of a communication-parameter providing apparatus according to a third embodiment.

FIG. 5 is a flowchart of the operation of the apparatus A operating as a communication-parameter providing apparatus. When the setting button 106 is operated in the apparatus A, the process shown in FIG. 5 is started. When the setting button 106 is operated, a timer for determining whether a time limit of a communication-parameter automatic setting process has reached is activated. When this timer expires, the communication-parameter setting process is terminated even during the processing in steps S501 to S509.

When a communication-parameter automatic setting process starts, the apparatus A performs a network search process for checking the situations of a nearby network (S501).

The apparatus A determines, on the basis of the result of the network search, whether a communication-parameter receiving apparatus is detected (S502).

There are two search methods, the active scan method and the passive scan method. Any of the two methods can be used, or the two methods can be combined to perform a search process. As has been described above, when a probe request including additional information indicating communication-parameter automatic setting is received, it can be determined that a receiving apparatus exists. That is, waiting for a probe request including additional information indicating communication-parameter automatic setting is included in the network search process in this embodiment.

When no communication-parameter receiving apparatus is detected in step S502, the flow returns to step S501, and the network search process in step S501 is repeated until a communication-parameter receiving apparatus is detected.

When a communication-parameter receiving apparatus is detected in step S502, whether another apparatus exists in the network 31 is determined on the basis of the result of the network search in step S501 (S503).

When another apparatus is detected in step S503, it means that, besides the apparatus A, there is an apparatus that sends a beacon in the network 31. In this embodiment, the apparatus A and the apparatus B send a beacon one at a time.

As has been described above, in the IEEE 802.11 wireless LAN ad-hoc network, it is defined that an apparatus that sends a probe response is an apparatus that sent a beacon immediately before receiving a probe request.

Therefore, in a providing apparatus search process (steps S701 to S703 shown in FIG. 7) performed by a communication-parameter receiving apparatus (apparatus C in this embodiment), the beacon control unit 213 sets CW to CWmin so that the apparatus A can be detected in a short period of time (S504). In this way, the number of beacons sent by the apparatus A per unit time is maximized.

By setting the beacon sending frequency (sending rate) of the apparatus A higher than that of the apparatus B, when the apparatus C searches for a providing apparatus by performing active scan, the probability of the apparatus C receiving a probe response from the apparatus A becomes higher. Even in the case where the apparatus C searches for a providing apparatus by performing passive scan, the probability of receiving a beacon from the apparatus A becomes higher. As a result, the probability of the apparatus C not detecting the apparatus A, which is a providing apparatus, before the time limit of the communication-parameter setting process expires can be reduced. If the apparatus C can detect the apparatus A in a short period of time, the time until completion of providing communication parameters can be reduced.

If no other apparatus is detected in step S503, it means that the apparatus A is the only apparatus that sends a beacon in the network 31. Therefore, the apparatus C, which is a receiving apparatus, can easily detect the apparatus A, which is a providing apparatus. Thus, CW is not changed, and the flow proceeds to step S505. Even when no other apparatus is detected, a network search process may periodically be performed, and, if another apparatus is detected, the value of CW may be set to the minimum value.

When the apparatus A receives a probe request in step S505, it is determined whether the apparatus A sent a beacon immediately before receiving the probe request (S505-1).

When the apparatus A sent a beacon immediately before receiving the probe request, the apparatus A sends a probe response including additional information indicating communication-parameter automatic setting (S506). When the apparatus A sent no beacon immediately before receiving the probe request, the flow proceeds to step S507.

The apparatus A waits for a communication-parameter providing request to be received from the apparatus C, which is a receiving apparatus (S507). When a communication-parameter providing request from the apparatus C is received in step S507, it can be determined that the apparatus C has detected the apparatus A. Thereafter, it becomes unnecessary for the apparatus A to send more beacons than that sent by the apparatus B. Thus, the beacon control unit 213 resets CW to the initial value (S508). As a result, the number of beacons sent by the apparatus A per unit time becomes equivalent to the number of beacons sent by the apparatus B. As above, when a communication-parameter providing request is received from a receiving apparatus, the beacon sending frequency (sending rate) is reset to that of other apparatuses, whereby unnecessary power consumption can be suppressed.

Thereafter, communication parameters are provided to the receiving apparatus C, which has requested communication parameters to be provided (S509).

After the communication parameters are provided, the apparatus A determines whether the timer for determining whether the time limit of the communication-parameter automatic setting process has reached has expired (S510).

When the timer has not expired, the flow returns to step S501 and is repeated. In contrast, when the timer has expired in step S510, the communication-parameter automatic setting process is terminated. When communication parameters are provided to one receiving apparatus, the process may be terminated without performing the determination in step S510.

In the above embodiment, it has been described that, by the network search process in step S501, whether a receiving apparatus exists, and whether another apparatus exists in the network 31 are determined. However, these determinations may be made by performing individual search processes. For example, a search for a receiving apparatus may be performed by waiting for reception of a probe request including additional information indicating communication-parameter automatic setting, and thereafter, a search for another apparatus in the network 31 may be performed by performing active scan.

As above, according to this embodiment, when an apparatus other than a providing apparatus exists in a network, control is performed to maximize the number of beacons sent by the providing apparatus per unit time. Therefore, the probability of a receiving apparatus detecting the providing apparatus in a yet shorter period of time can be increased. As a result, the probability of the receiving apparatus not detecting the providing apparatus before the time limit of a communication-parameter setting process expires can be reduced. In particular, this is more effective in the case where there is a plurality of other apparatuses. Since the providing apparatus is detected in a short period of time, the time until completion of providing communication parameters can be reduced. Furthermore, when a communication-parameter providing request is received from the receiving apparatus, the number of beacons sent per unit time is controlled to be equivalent to that of other apparatuses, whereby unnecessary power consumption can be suppressed.

Fourth Embodiment

In the third embodiment, the case where a communication-parameter providing apparatus checks the situations of a nearby network, confirms the existence of a communication-parameter receiving apparatus, and, if another communication apparatus is detected in a network where the providing apparatus exists, sets CW to the minimum value has been described. In a fourth embodiment, an example where the providing apparatus sets CW to the minimum value upon detection of the existence of a receiving apparatus, or the existence of another communication apparatus in a network where the providing apparatus exists, will be described. Since the operation of the apparatus C serving as a receiving apparatus is the same as that in the first embodiment described with reference to FIG. 7, a repeated description thereof is omitted to avoid redundancy.

Figure 9:
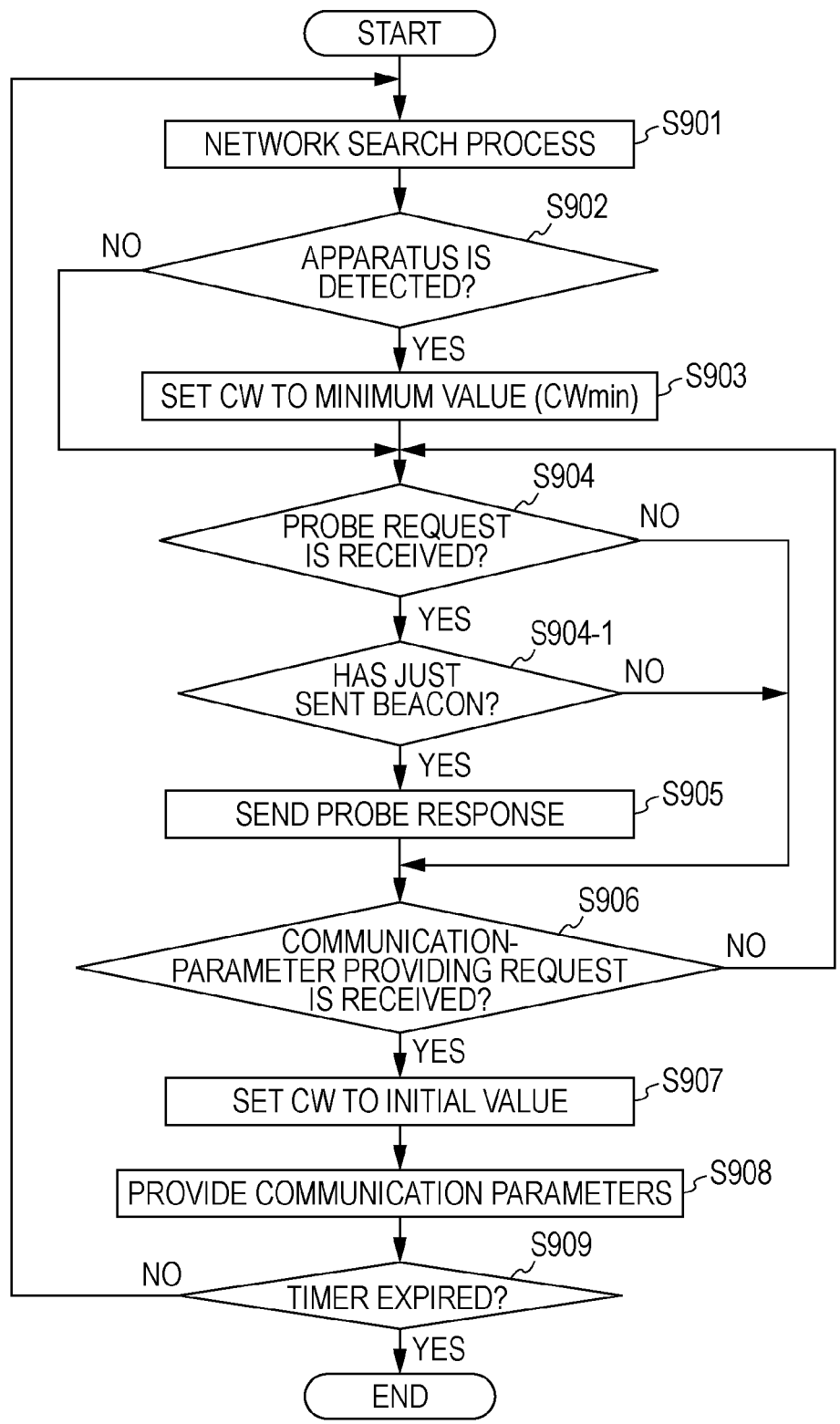
FIG. 9 is a flowchart showing an operation of a communication-parameter providing apparatus according to a fourth embodiment.

FIG. 9 is a flowchart of the operation of the apparatus A operating as a communication-parameter providing apparatus. When the setting button 106 is operated in the apparatus A, the process shown in FIG. 9 is started. When the setting button 106 is operated, a timer for determining whether a time limit of a communication-parameter automatic setting process has reached is activated. When this timer expires, the communication-parameter setting process is terminated even during the processing in steps S901 to S908.

When a communication-parameter automatic setting process starts, the apparatus A performs a network search process for checking the situations of a nearby network (S901). It is determined, on the basis of the result of the network search process, whether a communication-parameter receiving apparatus is detected or whether another apparatus exists in the network 31 (S902).

There are two search methods, the active scan method and the passive scan method. Any of the two methods can be used, or the two methods can be combined to perform a search process. As has been described above, when a probe request including additional information indicating communication-parameter automatic setting is received, it can be determined that a receiving apparatus exists. That is, waiting for a probe request including additional information indicating communication-parameter automatic setting is included in the network search process in this embodiment.

When a communication-parameter receiving apparatus, or another apparatus existing in the network 31 is detected, the flow proceeds to step S903, and CW is set to the minimum value.

That is, when a communication-parameter receiving apparatus is detected, CW is set to the minimum value regardless of whether another apparatus in the network 31 is detected. In this way, when another apparatus exists in the network 31, the sending frequency (sending rate) of the apparatus A becomes higher than that of this other apparatus. Thus, the probability of the apparatus C, which is a receiving apparatus, detecting the apparatus A in a short period of time becomes higher. When the existence of another apparatus in the network 31 is detected, CW is set to the minimum value regardless of whether a communication-parameter receiving apparatus is detected. In this way, even when the receiving apparatus starts a communication-parameter automatic setting process after the apparatus A, the probability of the receiving apparatus detecting the apparatus A immediately after the start of the setting process becomes higher.

Since the processing from step S903 onward is the same as the processing from step S504 onward in FIG. 5, a repeated description thereof is omitted to avoid redundancy.

As above, according to this embodiment, CW is set to the minimum value when another apparatus existing in the same network or a receiving apparatus is detected, whereby the probability of the receiving apparatus detecting a providing apparatus in a yet shorter period of time can be increased. As a result, the probability of the receiving apparatus not detecting the providing apparatus before the time limit of a communication-parameter setting process expires can be reduced. In particular, this is more effective in the case where there is a plurality of other apparatuses. Since the providing apparatus is detected in a short period of time, the time until completion of providing communication parameters can be reduced. Furthermore, when a communication-parameter providing request is received from the receiving apparatus, the number of beacons sent per unit time is controlled to be equivalent to that of other apparatuses, whereby unnecessary power consumption can be suppressed.

Fifth Embodiment

In the first to fourth embodiments, the case where the number of beacons sent per unit time is increased at the point at which a communication-parameter providing apparatus detects the existence of another apparatus has been described. In a fifth embodiment, another method for enabling a communication-parameter receiving apparatus to detect a providing apparatus in a short period of time will be described. Since the operation of the apparatus C serving as a receiving apparatus is the same as that in the first embodiment described with reference to FIG. 7, a repeated description thereof is omitted to avoid redundancy.

Figure 6:
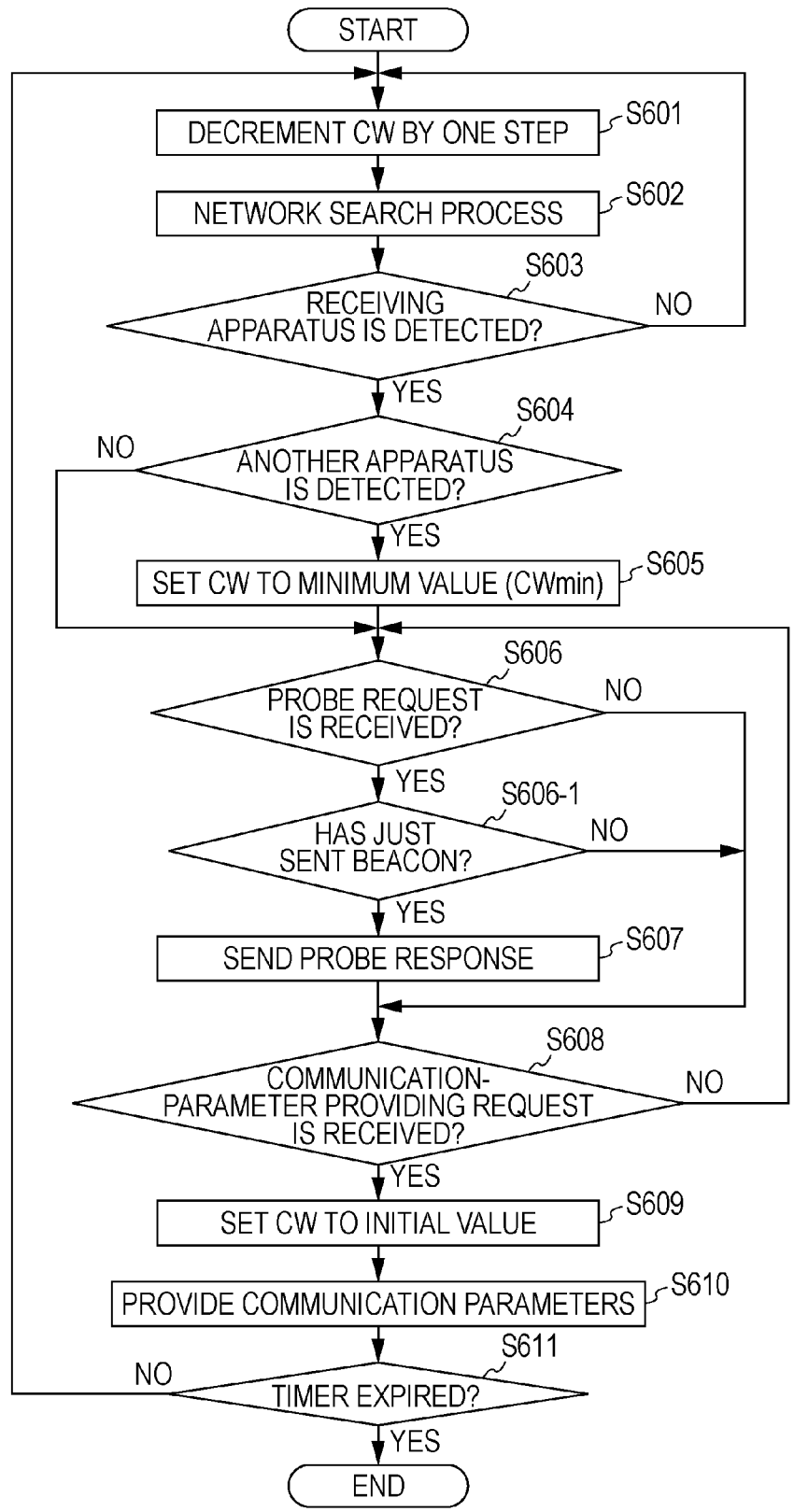
FIG. 6 is a flowchart showing an operation of a communication-parameter providing apparatus according to a fifth embodiment.

FIG. 6 is a flowchart of the operation of the apparatus A operating as a communication-parameter providing apparatus. When the setting button 106 is operated in the apparatus A, the process shown in FIG. 6 is started. When the setting button 106 is operated, a timer for determining whether a time limit of a communication-parameter automatic setting process has reached is activated. When this timer expires, the communication-parameter setting process is terminated even during the processing in steps S601 to S610.

When a communication-parameter automatic setting process starts, the beacon control unit 213 in the apparatus A sets CW to a value that is one step less than the initial value (S601). That is, unlike the first to fourth embodiments, the value of CW is automatically reduced in response to the start of an automatic setting process, without checking the situations of a nearby network. In this way, when another apparatus exists in the network 31, the beacon sending frequency (sending rate) of the apparatus A becomes higher than that of the other apparatus. Thus, the probability of the apparatus C, which is a receiving apparatus, detecting the apparatus A in a short period of time becomes higher.

Next, the apparatus A performs a network search process in order to check the situations of a nearby network (S602). The apparatus A determines, on the basis of the result of the network search, whether a communication-parameter receiving apparatus is detected (S603).

There are two search methods, the active scan method and the passive scan method. Any of the two methods can be used, or the two methods can be combined to perform a search process. As has been described above, when a probe request including additional information indicating communication-parameter automatic setting is received, it can be determined that a receiving apparatus exists.

When no communication-parameter receiving apparatus is detected in step S603, the value of CW of the apparatus A is further decremented by one step (S601), and the network search process is performed again (S602).

When a communication-parameter receiving apparatus is detected in step S603, whether another apparatus exists in the network 31 is determined on the basis of the result of the network search in step S602 (S604).

When another apparatus is detected in step S604, it means that, besides the apparatus A, there is an apparatus that sends a beacon in the network 31. In this embodiment, the apparatus A and the apparatus B send a beacon one at a time.

In order to enable the communication-parameter receiving apparatus (apparatus C in this embodiment) to detect the existence of the apparatus A in a short period of time, the beacon control unit 213 maximizes the sending frequency (sending rate) of the apparatus A (S605). Specifically, the number of beacons sent by the apparatus A per unit time can be maximized by setting CW to CWmin.

As above, CW is reduced in response to the start of a communication-parameter setting process. When the existence of another apparatus is detected, CW is set to the minimum value, whereby the apparatus C, which is a receiving apparatus, can quickly detect the apparatus A.

If no other apparatus is detected in step S604, it means that the apparatus A is the only apparatus that sends a beacon in the network 31. Therefore, the apparatus C, which is a receiving apparatus, can easily detect the apparatus A, which is a providing apparatus. Thus, CW is not changed, and the flow proceeds to step S606. Even when no other apparatus is detected, for example, a network search process may periodically be performed, and, if another apparatus is detected, the value of CW may be set to the minimum value.

When the apparatus A receives a probe request in step S606, it is determined whether the apparatus A sent a beacon immediately before receiving the probe request (S606-1).

When the apparatus A sent a beacon immediately before receiving the probe request, the apparatus A sends a probe response including additional information indicating communication-parameter automatic setting (S607). When the apparatus A sent no beacon immediately before receiving the probe request, the flow proceeds to step S608.

The apparatus A waits for a communication-parameter providing request to be received from the apparatus C, which is a receiving apparatus (S608). When a communication-parameter providing request from the apparatus C is received in step S608, it can be determined that the apparatus C has detected the apparatus A. Thereafter, it becomes unnecessary for the apparatus A to send more beacons than that sent by the apparatus B. Thus, the beacon control unit 213 resets CW to the initial value (S609). As a result, the number of beacons sent by the apparatus A per unit time becomes equivalent to the number of beacons sent by the apparatus B. As above, when a communication-parameter providing request is received from a receiving apparatus, the beacon sending frequency (sending rate) is reset to that of other apparatuses, whereby unnecessary power consumption can be suppressed.

When a certain time elapsed without receiving a communication-parameter providing request in step S608 though no apparatus has been detected in step S604, CW may be decremented by one step. In other words, CW may be reduced step by step until a communication-parameter providing request is received from a receiving apparatus.

Thereafter, communication parameters are provided to the receiving apparatus C, which has requested communication parameters to be provided (S610).

After the communication parameters are provided, the apparatus A determines whether the timer for determining whether the time limit of the communication-parameter automatic setting process has reached has expired (S611).

When the timer has not expired, the flow returns to step S601 and is repeated. In contrast, when the timer has expired in step S611, the communication-parameter automatic setting process is terminated. When communication parameters are provided to one receiving apparatus, the process may be terminated without performing the determination in step S611.

In the above embodiment, it has been described that, by the network search process in step S602, whether a receiving apparatus exists, and whether another apparatus exists in the network 31 are determined. However, these determinations may be made by performing individual search processes. For example, a search for a receiving apparatus may be performed by waiting for reception of a probe request including additional information indicating communication-parameter automatic setting, and thereafter, a search for another apparatus in the network 31 may be performed by performing active scan.

As above, according to this embodiment, CW is set to a small value in response to the start of a communication-parameter automatic setting process. At the point at which another apparatus existing in the same network is detected, CW is set to the minimum value. In this way, the probability of a receiving apparatus detecting a providing apparatus in a short period of time can be increased. As a result, the probability of the receiving apparatus not detecting the providing apparatus before the time limit of a communication-parameter setting process expires can be reduced. Since the providing apparatus is detected in a short period of time, the time until completion of providing communication parameters can be reduced. Also, when a communication-parameter providing request is received from the receiving apparatus, the number of beacons sent per unit time is controlled to be equivalent to that of other apparatuses, whereby unnecessary power consumption can be suppressed.

Sixth Embodiment

In the fifth embodiment, the case where a communication-parameter providing apparatus changes CW in response to the start of a setting process, confirms the existence of a communication-parameter receiving apparatus, and, if another communication apparatus is detected in a network where the providing apparatus exists, sets CW to the minimum value has been described. In a sixth embodiment, an example where the providing apparatus sets CW to the minimum value upon detection of the existence of a receiving apparatus, or the existence of another communication apparatus in a network where the providing apparatus exists, will be described. Since the operation of the apparatus C serving as a receiving apparatus is the same as that in the first embodiment described with reference to FIG. 7, a repeated description thereof is omitted to avoid redundancy.

Figure 10:
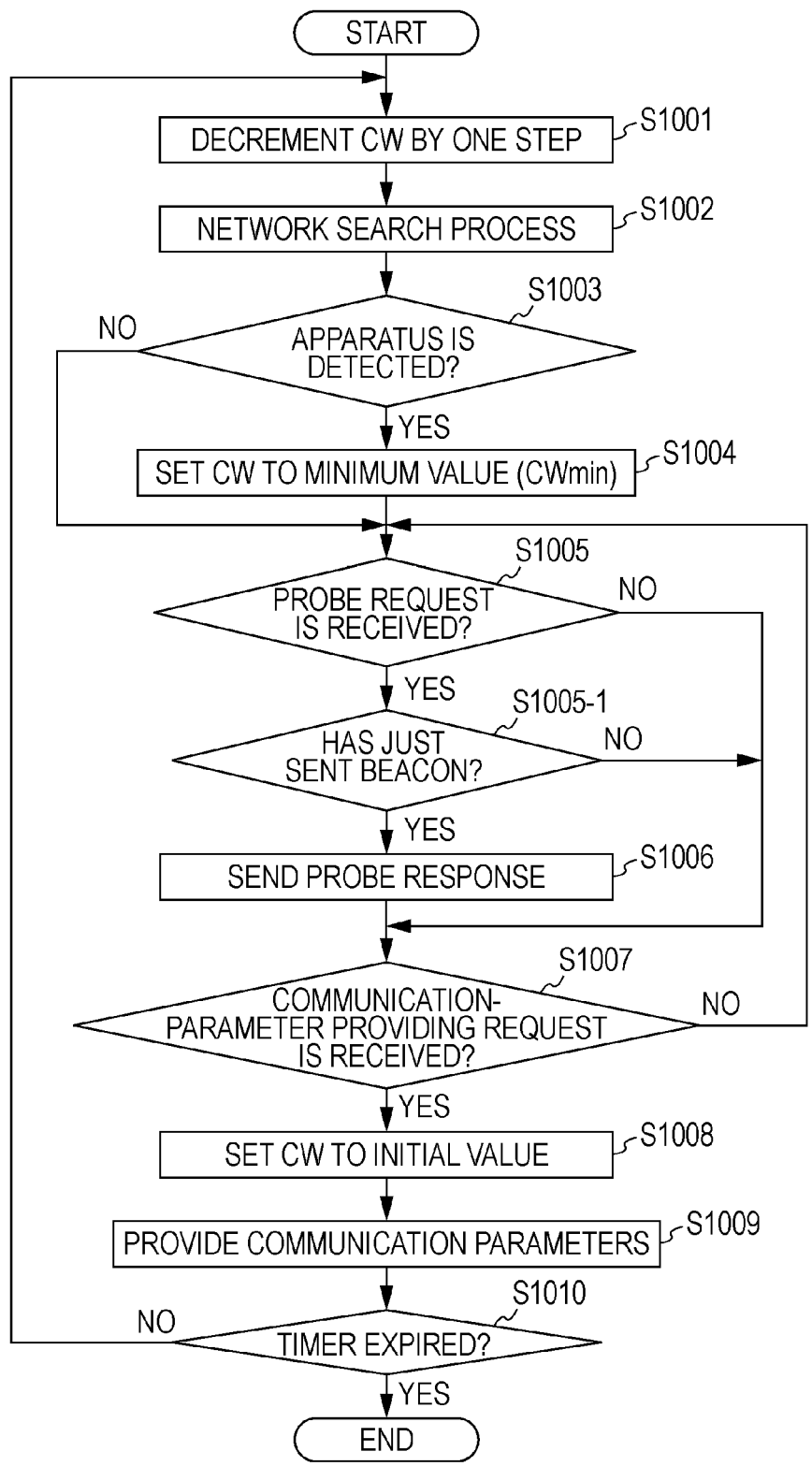
FIG. 10 is a flowchart showing an operation of a communication-parameter providing apparatus according to a sixth embodiment.

FIG. 10 is a flowchart of the operation of the apparatus A operating as a communication-parameter providing apparatus. When the setting button 106 is operated in the apparatus A, the process shown in FIG. 10 is started. When the setting button 106 is operated, a timer for determining whether a time limit of a communication-parameter automatic setting process has reached is activated. When this timer expires, the communication-parameter setting process is terminated even during the processing in steps S1001 to S1009.

When a communication-parameter automatic setting process starts, the beacon control unit 213 in the apparatus A sets CW to a value that is one step less than the initial value (S1001). That is, unlike the first to fourth embodiments, the value of CW is automatically reduced in response to the start of an automatic setting process, without checking the situations of a nearby network. In this way, when another apparatus exists in the network 31, the beacon sending frequency (sending rate) of the apparatus A becomes higher than that of the other apparatus. Thus, the probability of the apparatus C, which is a receiving apparatus, detecting the apparatus A in a short period of time becomes higher.

Next, the apparatus A performs a network search process in order to check the situations of a nearby network (S1002).

It is determined, on the basis of the result of the network search process, whether a communication-parameter receiving apparatus is detected or whether another apparatus exists in the network 31 (S1003).

There are two search methods, the active scan method and the passive scan method. Any of the two methods can be used, or the two methods can be combined to perform a search process. As has been described above, when a probe request including additional information indicating communication-parameter automatic setting is received, it can be determined that a receiving apparatus exists. That is, waiting for a probe request including additional information indicating communication-parameter automatic setting is included in the network search process in this embodiment.

When a communication-parameter receiving apparatus, or another apparatus existing in the network 31 is detected, the flow proceeds to step S1004, and CW is set to the minimum value.

That is, when a communication-parameter receiving apparatus is detected, CW is set to the minimum value regardless of whether another apparatus in the network 31 is detected. In this way, when another apparatus exists in the network 31, the sending frequency (sending rate) of the apparatus A becomes higher than that of this other apparatus. Thus, the probability of the apparatus C, which is a receiving apparatus, detecting the apparatus A in a short period of time becomes higher. When the existence of another apparatus in the network 31 is detected, CW is set to the minimum value regardless of whether a communication-parameter receiving apparatus is detected. In this way, even when the receiving apparatus starts a communication-parameter automatic setting process after the apparatus A, the probability of the receiving apparatus detecting the apparatus A immediately after the start of the setting process becomes higher.

Since the processing from step S1004 onward is the same as the processing from step S605 onward in FIG. 6, a repeated description thereof is omitted to avoid redundancy.

As above, according to this embodiment, CW is reduced in response to the start of a communication-parameter automatic setting process. When another apparatus existing in the same network or a receiving apparatus is detected, CW is set to the minimum value. Accordingly, the probability of the receiving apparatus detecting a providing apparatus in a yet shorter period of time can be increased. As a result, the probability of the receiving apparatus not detecting the providing apparatus before the time limit of a communication-parameter setting process expires can be reduced. In particular, this is more effective in the case where there is a plurality of other apparatuses. Since the providing apparatus is detected in a short period of time, the time until completion of providing communication parameters can be reduced. Furthermore, when a communication-parameter providing request is received from the receiving apparatus, the number of beacons sent per unit time is controlled to be equivalent to that of other apparatuses, whereby unnecessary power consumption can be suppressed. The exemplary embodiments disclosed herein are for illustrative purposes only, and the scope of the present invention is not limited to the embodiments. Various modifications can be made to the embodiments without departing from the gist of the present invention.

In the foregoing embodiments, examples in which the value of CW is changed in order to make the number of beacons sent by a providing apparatus per unit time greater than that of other apparatuses have been described. However, other parameters may be used as long as the number of beacons sent by the providing apparatus per unit can be made greater than that of other apparatuses. For example, when the beacon sending interval (beacon period) is changeable, the number of beacons sent per unit time can be increased by reducing the beacon sending interval of the providing apparatus.

In particular, when a providing apparatus detects a receiving apparatus, for example, a new network with a shorter beacon period is re-configured, thus enabling the receiving apparatus to detect the providing apparatus in a shorter period of time.

In the foregoing embodiments, the cases where CW is reset to the initial value upon receipt of a communication-parameter providing request from a receiving apparatus have been described. However, the timing to reset CW is not limited to the foregoing timing. That is, CW may be reset to the initial value when it is determined that a receiving apparatus has detected a providing apparatus. For example, CW may be reset when a providing apparatus sends a probe response to a received probe request from a receiving apparatus.

The description of the foregoing embodiments concerns the case where the wireless LAN conforming to IEEE 802.11 is used by way of example. However, the present invention is applicable to other wireless media such as a wireless universal serial bus (USB), MultiBand Orthogonal frequency-division multiplexing (OFDM) Alliance (MBOA), Bluetooth (registered trademark), ultra-wideband (UWB), and Zigbee. Alternatively, the present invention is applicable to a wired communication medium such as a wired LAN.

UWB includes a wireless USB, wireless 1394, WiNET, and the like.

Although the network identifier, the encryption method, the encryption key, the authentication method, and the authentication key serve as communication parameters in the description of the foregoing embodiment, other information may serve as communication parameters. That is, communication parameters include other information.

According to the present invention, a storage medium having recorded thereon a program code of software that realizes the foregoing functions is supplied to a system or apparatus, and a computer (central processing unit (CPU) or microprocessing unit (MPU)) of the system or apparatus reads and executes the program code stored on the storage medium. In this case, the program code itself read from the storage medium realizes the functions of the foregoing embodiments, and the storage medium having the program code recorded thereon constitutes the present invention.

As the storage medium for providing the program code, for example, a flexible disk, a hard disk, an optical disc, a magneto-optical disc, a compact disc read-only memory (CD-ROM), a compact disc-recordable (CD-R), a magnetic tape, a non-volatile memory card, a ROM, a digital versatile disc (DVD), or the like can be used.

As well as realizing the foregoing functions by executing the program code read by the computer, an operating system (OS) running on the computer may execute part of or the entirety of actual processing on the basis of instructions of the program code to realize the foregoing functions.

Furthermore, the program code read from the storage medium may be written into a memory included in a function expansion board placed in the computer or a function expansion unit connected to the computer. On the basis of the instructions of the program code, a CPU included in the function expansion board or the function expansion unit may execute part of or the entirety of actual processing to realize the foregoing functions.

As above, according to the foregoing embodiments, the present invention provides techniques for enabling a receiving apparatus that receives provided communication parameters to easily and quickly detect a providing apparatus that provides communication parameters.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-098269, filed Apr. 4, 2008, which is hereby incorporated by reference herein in its entirety.

The invention claimed is:
1. A communication apparatus, comprising:
a processor; and
a memory storing program instructions that, when executed by the processor, causes the communication apparatus to:

provide a communication parameter for network communication to a communication-parameter receiving apparatus that receives a provided communication parameter for performing communication;

perform a search process for detecting another communication apparatus; and change a value for increasing the number of broadcast signals sent by the communication apparatus per unit time in response to detection of the communication-parameter receiving apparatus and another apparatus different from the communication-parameter receiving apparatus in a case that the communication apparatus performs as a provider which provides the communication parameter to the communication-parameter receiving apparatus, and not change the value for increasing the number of broadcast signals sent by the communication apparatus per unit time in a case that another apparatus is not detected.

2. The communication apparatus according to claim 1, wherein, in a case that the communication-parameter receiving apparatus and another apparatus different from the communication-parameter receiving apparatus are detected in a same wireless network with the communication apparatus, the value is changed so that the number of broadcast signals sent by the communication apparatus per unit time becomes greater than the number of broadcast signals sent by the another communication apparatus per unit time.

3. The communication apparatus according to claim 1, wherein the communication apparatus changes the value to the smaller value.

4. The communication apparatus according to claim 1, wherein the value is periodically changed after the communication-parameter receiving apparatus and the another communication apparatus is detected by performing the search process.

5. The communication apparatus according to claim 1, wherein the value is changed in accordance with the number of other communication apparatuses detected by performing the search process.

6. The communication apparatus according to claim 1, wherein the value is changed to a predetermined minimum value in response to detection of the communication-parameter receiving apparatus and the another communication apparatus is detected by performing the search process.

7. The communication apparatus according to claim 1, wherein the value comprises a parameter for determining a sending probability of the broadcast signal.

8. The communication apparatus according to claim 1, wherein the value comprises a parameter for determining a waiting time until sending a broadcast signal from the communication apparatus.

9. The communication apparatus according to claim 1, wherein the value comprises a value of a contention window.

10. The communication apparatus according to claim 1, wherein the communication parameter comprises at least one of an encryption method, an encryption key, an authentication method, and an authentication key.

11. A communication method for a communication apparatus that has a function of providing a communication parameter for network communication to a communication-parameter receiving apparatus that receives a provided communication parameter for performing communication, the communication method being implemented by program instructions that, when executed by a processor, causes the communication apparatus to perform the following:

performing a search process for detecting another communication apparatus; and changing a value for increasing the number of broadcast signals sent by the communication apparatus per unit time in response to detection of the communication-parameter receiving apparatus and another apparatus different from the communication-parameter receiving apparatus in a case that the communication apparatus performs as a provider which provides the communication parameter to the communication-parameter receiving apparatus, and not changing the value for increasing the number of broadcast signals sent by the communication apparatus per unit time in a case that another apparatus is not detected.

* * * * *